United States Patent [19]

Riva

[11] Patent Number: 4,805,526
[45] Date of Patent: Feb. 21, 1989

[54] BAKING PLATE

[76] Inventor: Teobaldo Riva, Corso Duca degli Abruzzi 41, Torino, Italy

[21] Appl. No.: 942,756

[22] Filed: Dec. 17, 1986

[30] Foreign Application Priority Data

Dec. 23, 1985 [IT] Italy ............................. 54284/85[U]

[51] Int. Cl.⁴ ...................... A47J 37/00; A47J 27/00
[52] U.S. Cl. .................................. 99/422; 126/246; 126/390
[58] Field of Search ................... 99/422–425; 126/246, 261, 262, 375, 381, 390, 391, 400; 219/385–387, 430, 432–433, 438–439, 443, 457, 462, 464, 530, 540

[56] References Cited

U.S. PATENT DOCUMENTS 4,243,016  1/1981  Kristen et al. ................. 219/464 X
4,622,948  11/1986  Oh ..................................... 99/422 X

FOREIGN PATENT DOCUMENTS 11888 of 1884  United Kingdom ................ 126/390

Primary Examiner—John M. Jillions
Attorney, Agent, or Firm—Sughrue, Mion, Zinn, Macpeak & Seas

[57] ABSTRACT

A baking plate comprises a stone slab inserted in an annular metal support. The metal support has a peripheral recess facing the slab and a high-temperature-resistant bonding resin is inserted between the metal support and the slab filling the said recess.

3 Claims, 1 Drawing Sheet

U.S. Patent
Feb. 21, 1989
4,805,526
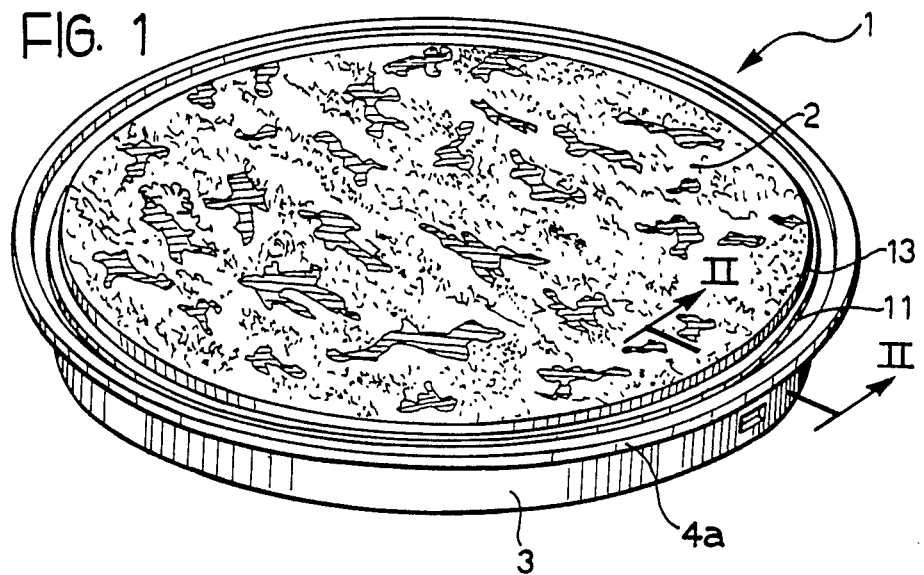
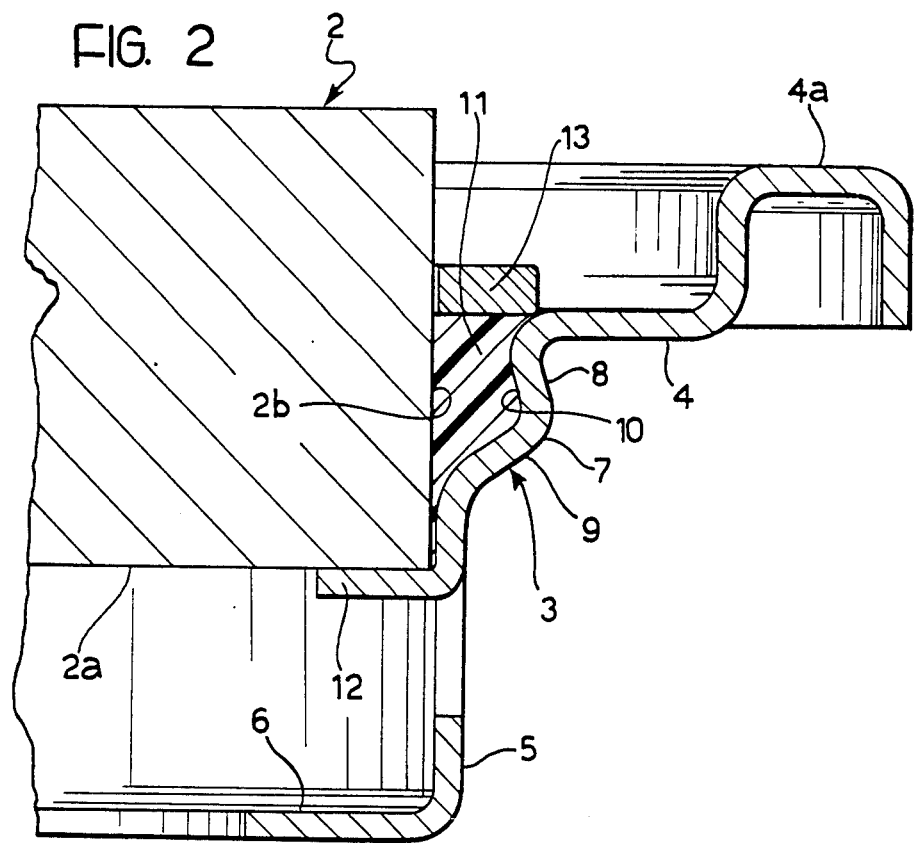

BAKING PLATE

The present invention relates to baking plates in general.

More particularly, the invention relates to a baking plate of the type comprising a stone slab inserted in an annular metal support whereby the stone may be located immediately over a gas ring or like heat source in use.

In known baking plates of the type specified above, the plate is normally connected to the metal support by a simple force coupling. Such a connection is extremely precarious because of the different coefficients of thermal expansion of the stone and the metal support which, in use, may cause accidental separation of the stone in use with the resulting risk of damage.

The object of the present invention is to provide a baking plate of the type defined above which is strong and adapted to avoid the problems connected with the different coefficients of thermal expansion of the stone and the metal support, in use, so as to ensure a long working life.

According to the invention this object is achieved by means of a baking plate of the type defined at the beginning, characterised in that the annular metal support has a peripheral space facing the stone slab and in that a high-temperature-resistant bonding resin is inserted between the metal support and the stone, filling the peripheral space.

The bonding resin ensures a strong, firm connection of the stone to the annular metal support, while compensating, in use, for their differing thermal distortions.

The recess in the annular metal support preferably faces the peripheral side surface of the stone slab.

In this case the recess is conveniently defined by an upper, downwardly-diverging wall and a lower, downwardly-converging wall terminating close to the lower edge of the side surface of the stone.

In order to facilitate the assembly of the plate, support members are provided beneath the lower, downwardly-converging surface of the metal support, on which the lower face of the stone rests.

The invention will now be described in detail with reference to the appended drawings, provided purely by way of non-limiting example, in which:

FIG. 1 is a perspective view of a baking plate according to the invention, and

FIG. 2 is a vertical sectional view, on an enlarged scale, taken on the line II—II of FIG. 1.

In the drawings, a baking plate according to the invention is generally indicated 1 and is constituted by a circular stone slab 2, for example of granite, inserted in an annular metal support 3 of complementary shape.

The metal support 3 has, in cross-section, an upper, radially-outwardly-projecting portion 4 terminating in a folded edge 4a which serves as a hand grip and a lower part 5 which extends axially beneath the lower face 2a of the stone slab 2 and has an end portion 6 bent radially inwardly and acting as a support base of the plate 1.

The upper and lower parts 4 and 5 are connected by an intermediate portion 7 facing the peripheral side surface 2b of the slab 2 but spaced therefrom, the portion being defined by an upper, downwardly-diverging wall 8 and a lower, downwardly-converging wall 9 terminating close to the lower face 2a of the slab 2.

The walls 8 and 9 define a circumferential re-entrant recess 10 filled with a resin 11 by which the intermediate part 7 of the metal support 3 and the side surface 2b of the slab 2 are permanently joined.

The resin 11 is a resin with good characteristics of resistance and stability to high temperatures, for example an organic-silicate-based resin or a phenolic- or epoxy-based resin or yet another type of suitable resin.

In the zone of connection between the parts 9 and 5, the metal support 3 has a series of tabs 12, made by partial-blanking and bending radially inwardly, on which the lower face 2a of the slab 2 rests. There are conveniently three or four tabs 12 equi-angularly spaced from each other.

Reference 13 indicates a metal ring applied, for purely aesthetic purposes, to the upper face of the resin mass 11 around the upper zone of the lateral wall 2b of the slab 2.

Naturally the constructional details of the plate 1 could be varied with respect to those described and illustrated by way of example without departing from the scope of the present invention. Thus, for example, the space containing the annular filling of resin 11 could be formed between the base 6 of the metal support 3 and the lower face 2a of the slab 2 instead of at the side.

Moreover, the radial supporting tabs 12 could be substituted with an annular bearing formed by upwardly bending the perimetral edge of the base 6 of the metal support 3.

What is claimed is:

1. A baking plate comprising a stone slab inserted in an annular metal support, wherein said metal support and a facing peripheral portion of said slab together define a peripheral space and wherein a high-temperature-resistant bonding resin fills said space, said resin being an organic-silicate-based resin;
    wherein said peripheral portion of said slab comprises its lateral peripheral surface and said peripheral space is defined between said surface and a surrounding annular wall of said support; and
    wherein said annular wall includes an upper, downwardly-diverging portion and a lower, downwardly-converging portion terminating in correspondence with the lower face of the stone slab.

2. A plate according to claim 1, wherein said metal support includes said annular wall extending below said slab and having radially-bent tabs extending inwardly on which the lower face of the stone slab rests and a horizontally extending base flange spaced from said tabs.

3. A plate according to claim 1 further comprising an annular horizontally disposed flange extending outwardly from the top edge of said annular wall of said metal support and having an upwardly extending inverted U-shaped channel about the periphery thereof to provide finger gripping means and define an annular recess between the periphery of said slab and the inverted U-shaped channel to collect liquid secretions from food being cooked on said slab.

* * * * *